Figure 1:
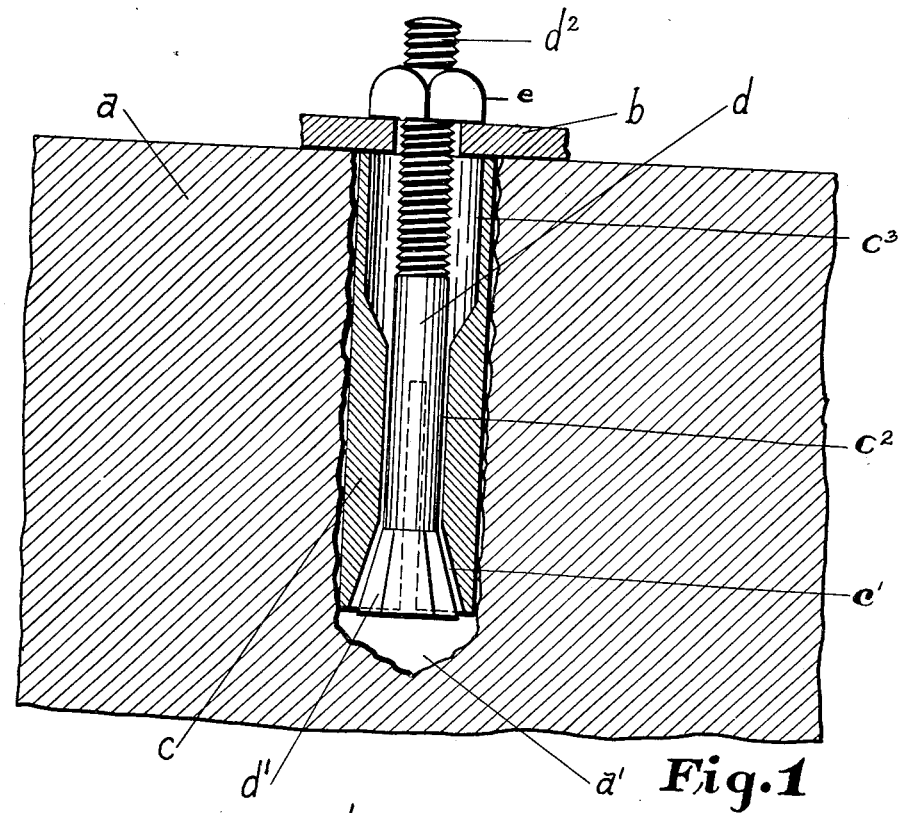

R. S. PEELLE.
FOUNDATION BOLT.
APPLICATION FILED JAN. 30, 1919.

1,381,428.

Patented June 14, 1921.

Robert S. Peelle Inventor
By his Attorney
Frank P. Wentworth

UNITED STATES PATENT OFFICE.

ROBERT S. PEELLE, OF HOLLIS, NEW YORK, ASSIGNOR TO THE PEELLE COMPANY, A CORPORATION OF NEW YORK.

FOUNDATION-BOLT.

1,381,428.　　　　Specification of Letters Patent.　　Patented June 14, 1921.

Application filed January 30, 1919. Serial No. 273,984.

*To all whom it may concern:*

Be it known that I, ROBERT S. PEELLE, a citizen of the United States, residing at Hollis, in the borough of Queens, city of New York, county of Queens, and State of New York, have invented certain new and useful Improvements in Foundation-Bolts, of which the following is a specification, reference being had therein to the accompanying drawings, which form a part thereof.

My invention relates to foundation bolts, and more particularly to a type thereof particularly adapted for use in securing the guide rails for elevator doors to the masonry adjacent the door openings.

Heretofore it has been the common practice to secure these guide rails by means of bolts consisting of an expansible sleeve seated in a drill hole in the masonry and having slidably mounted therein a wedge nut adapted to be engaged by a screw bolt passed through the guide rail, the tightening of the bolt expanding the sleeve so as to firmly embed it in the masonry. While this type of bolt has given satisfactory results heretofore, it has always been more or less unsatisfactory because of a necessity for great accuracy in the positioning of the bolt openings in the guide rail, in order to permit the screw bolt to engage the threads of the nut in a manner to prevent stripping of the bolt. Furthermore, in attempting to pick up the nut, there was always a likelihood that it would be pushed from within the sleeve into the drill hole in the masonry, thus necessitating the taking down of the rail in order to replace the nut. The rails for elevator doors are usually of a length requiring the use of a number of bolts, so that inaccuracy in the positioning of one bolt opening therein, may be a source of great annoyance and a considerable loss of time in the installation of a door equipment.

With these conditions in mind, I have produced a foundation bolt wherein a wedge nut may be dispensed with and wherein the bolt may be deflected in relation to the sleeve, in a manner to compensate for slight irregularities in the bolt openings in the rail, thus greatly facilitating the installation of the rails, without a loss of the necessary alinement of one section thereof with the adjoining sections.

A further advantage of a bolt made in accordance with my invention, is that there is no possibility of such a disarrangement of the bolt structure as would necessitate the taking down of a rail in order to reassemble the bolt. With a bolt made in accordance with my invention, if desired, a lock bolt may be employed to prevent possible loosening of the rail, as a result of vibration.

The invention consists primarily in a foundation bolt embodying therein an expansible sleeve adapted to be seated in a drill hole, a screw bolt having a tapered head slidably mounted in said sleeve, with the screw threaded end thereof projecting beyond the end of said sleeve, and a nut coöperating with said screw threaded end; and in such other novel features of construction and combination of parts as are hereinafter set forth and described, and more particularly pointed out in the claim hereto appended.

Figure 2:
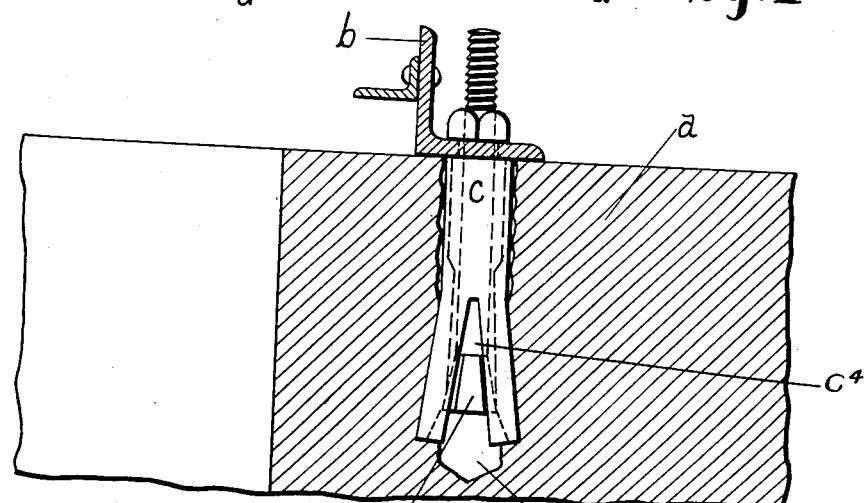

Referring to the drawings,

Figure 1 is a cross sectional view of a bolt embodying my invention, before the expansible sleeve has been forced into the masonry of the wall by the tightening of the nut; and Fig. 2 is an elevation thereof, after the expansion of the sleeve.

Like letters refer to like parts in both of said views.

In the accompanying drawings, I have shown at $a$ a portion of a masonry wall having an opening $a'$ drilled therein and a rail $b$ for an elevator door secured in place thereupon by means of bolts made in accordance with my invention. Fig. 1 of the drawings is a section upon a vertical plane, while Fig. 2 is a section upon a horizontal plane.

In the embodiment of my invention shown in the drawings, I provide a sleeve $c$ adapted to be seated within the opening $a'$, said sleeve being of a length approximating the depth of said opening. The bore of the sleeve $c$ while extending from end to end thereof, differs in contour at different points thereof, the inner end $c'$ of the bore preferably being in the form of a truncated polyhedron, preferably a hexahedron, with its base toward the end of the sleeve; the central portion $c^2$ thereof being cylindrical, and the other end $c^3$ thereof being cylindrical and enlarged, as shown. The end of the sleeve $c$ is provided with oppositely disposed, longitudinal slots $c^4$, permitting the expansion of the end of the bolt adjacent the portions $c'$ and $c^2$ of the bore.

Passing through, and slidably mounted in, the sleeve $c$ is a screw bolt $d$ having a wedge-shaped head formed as a truncated polyhedron, corresponding in contour, and adapted to coöperate, with the walls of the portion $c'$ of the sleeve $c$. The length of said bolt $d$ is such as to have the screw-threaded end $d^2$ thereof project for a considerable distance, beyond the opposite end of the sleeve $c$. The diameter of the bolt $d$ is such as to not only afford a free sliding fit thereof within the portion $c^2$ of the bore of said sleeve, but also to afford sufficient space between the bolt and portion $c^2$ to permit the bolt to be deflected in any direction, so that it may be adjusted with relation to its bolt opening in the rail $b$, to an extent to compensate for an absence of exactitude in the positioning of said opening. In fact when using a bolt having a wedge-shaped head of the character described, the screw-threaded end $d^2$ of said bolt may be bent slightly out of true to adjust it to the bolt opening, without in any way modifying the operative effect of the head $d'$ of the bolt $d$ in relation to said sleeve $c$.

Coöperating with the screw-threaded end $d^2$ of the bolt $d$, is an ordinary nut $e$ by means of which movement of the bolt $d$ longitudinally of the sleeve $c$, may be effected, while at the same time the rail $b$ is secured in relation to the wall $a$.

When using bolts made in accordance with my invention, the openings $a'$ are drilled in the wall $a$ to the desired depth, and in the desired locations. The bolt $d$ is then slipped through the sleeve $c$ with the head $d'$ thereof loosely fitted in the portion $c'$ of the bore of said sleeve, and a sleeve with the bolt therein is inserted in its opening $a'$ with the outer end of the sleeve substantially flush with the face of the wall $a$.

When the bolts are thus positioned in the openings $a'$, the screw-threaded end $d^2$ of each bolt will project beyond the wall $a$ in a manner to permit the rail $b$ to be brought against the wall, openings approximating the spacing of the various openings $a'$ having been drilled in said rail.

If it be found that any opening in the rail is not positioned with absolute accuracy in relation to the protruding end of the bolt $d$, the bolt may be moved about in its sleeve $c$ until its passage through the opening in said rail is secured. As heretofore stated, if necessary, the end $d^2$ of the bolt may be bent slightly, if desired.

When the various bolt ends $d^2$ have been passed through the openings in the rail, a nut $e$ is applied to each of said ends and tightened up by means of a wrench, the tightening of the bolt having the two-fold effect of drawing the bolt longitudinally of the sleeve $c$, while holding the rail $b$ against the exposed end of the sleeve $c$ and the wall $a$.

Longitudinal movement of the bolt $d$ causes the head $d'$ thereof, through its engagement with the portion $c'$ of the bore, to force the opposite sides of the sleeve outwardly into the masonry of the wall in a manner to firmly lock the sleeve in the opening $a'$ and thus prevent displacement of the bolt $d$ and of the rail $b$.

It will be observed that since the screw-threaded end of the bolt is exposed exteriorly of the wall, the nut $e$ may be applied thereto without any likelihood of the stripping of the threads of the bolt through a failure to properly pick up the threads, and that there can be no such disarrangement of the coöperating parts as would necessitate the removal of a rail.

After the bolts have been drawn longitudinally of the sleeve $c$ sufficiently to insure the desired locking of said sleeve in position in the opening $a'$, the end $d^2$ of the bolt extending beyond the nut $e$, may, if desired, be cut off and upset to lock the nut upon the bolt, or, if desired, a lock nut may be mounted upon the bolt $d$.

By using a polyhedron-shaped head upon the bolt $d$, I limit the movement of the bolt $d$ in the sleeve $c$ to a movement longitudinally of said sleeve, and thus permit the desired force to be applied to the nut $e$ to expand the inner end of the sleeve $c$ to the desired extent.

It is not my intention to limit the invention to the precise details of construction shown in the accompanying drawings, it being apparent that such may be varied without departing from the spirit and scope of the invention.

Having described the invention, what I claim as new and desire to have protected by Letters Patent, is:—

A foundation bolt embodying therein a sleeve adapted to be seated in a drill hole, the bore of said sleeve at one end thereof being in the form of a truncated polyhedron with its base toward the end of the sleeve, at the other end thereof being cylindrical and enlarged, and the central portion connecting said end portions being cylindrical, and said sleeve adjacent said portion formed as a polyhedron being slotted, a screw bolt having a loose bearing in said central cylindrical portion of the bore of said sleeve, whereby said bolt may be moved radially of said sleeve, said bolt having a wedge shaped head in the form of a truncated polyhedron conforming in contour with the portion of said sleeve adjacent said slots, and a screw-threaded end projecting beyond the end of said sleeve, and a nut coöperating with said screw-threaded end.

In witness whereof I have hereunto affixed my signature, this 16th day of January, 1919, in the presence of two subscribing witnesses.

ROBERT S. PEELLE.

Witnesses:
F. T. WENTWORTH,
A. E. RENTON.